United States Patent
Komarek et al.

(10) Patent No.: US 11,374,944 B2
(45) Date of Patent: Jun. 28, 2022

(54) INSTANT NETWORK THREAT DETECTION SYSTEM

(71) Applicant: Cisco Technology, Inc., San Jose, CA (US)

(72) Inventors: Tomas Komarek, Frydek Mistek (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 16/224,963

(22) Filed: Dec. 19, 2018

(65) Prior Publication Data
US 2020/0204569 A1 Jun. 25, 2020

(51) Int. Cl.
| | |
|---|---|
| *H04L 29/06* | (2006.01) |
| *H04L 9/40* | (2022.01) |
| *H04L 41/142* | (2022.01) |
| *G06N 20/00* | (2019.01) |
| *G06K 9/62* | (2022.01) |

(52) U.S. Cl.
CPC ........ *H04L 63/1416* (2013.01); *G06K 9/6232* (2013.01); *G06K 9/6256* (2013.01); *G06K 9/6269* (2013.01); *G06K 9/6282* (2013.01); *G06N 20/00* (2019.01); *H04L 41/142* (2013.01); *H04L 63/145* (2013.01); *H04L 63/1425* (2013.01)

(58) Field of Classification Search
CPC .... G06N 20/00; G06K 9/6232; G06K 9/6256; G06K 9/6269; G06K 9/6282; H04L 41/142; H04L 63/1416; H04L 63/1425; H04L 63/145
See application file for complete search history.

(56) References Cited

U.S. PATENT DOCUMENTS

| | | | |
|---|---|---|---|
| 8,402,543 B1 * | 3/2013 | Ranjan | H04L 63/1416 726/23 |
| 9,288,220 B2 | 3/2016 | Raugas et al. | |
| 9,294,501 B2 | 3/2016 | Mesdaq et al. | |
| 9,419,996 B2 | 8/2016 | Porat et al. | |
| 2005/0251570 A1 | 11/2005 | Heasman et al. | |
| 2016/0226894 A1 | 8/2016 | Lee et al. | |

OTHER PUBLICATIONS

Schroff, et al., "FaceNet: A Unified Embedding for Face Recognition and Clustering", arXiv:1503.03832v3, 10 pages, Jun. 17, 2015, arXiv.org.
Xiong, et al., "Random Forests for Metric Learning with Implicit Pairwise Position Dependence", arXiv:1201.0610v1, pp. 1-13, Jan. 3, 2012, arXiv.org.

* cited by examiner

Primary Examiner — Jeffrey C Pwu
Assistant Examiner — Thong P Truong
(74) Attorney, Agent, or Firm — Behmke Innovation Group LLC; Kenneth J. Heywood; Jonathon P. Western

(57) ABSTRACT

In one embodiment, a network security service forms, for each of a plurality of malware classes, a feature vector descriptor for the malware class. The service uses the feature vector descriptors for the malware classes and a symmetric mapping function to generate a training dataset having both positively and negatively labeled feature vectors. The service trains, using the training dataset, an instant threat detector to determine whether telemetry data for a particular traffic flow is within a threshold of similarity to a feature vector descriptor for a new malware class that was not part of the plurality of malware classes.

20 Claims, 10 Drawing Sheets

INSTANT NETWORK THREAT DETECTION SYSTEM

TECHNICAL FIELD

The present disclosure relates generally to computer networks, and, more particularly, to an instant network threat detection system.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to exfiltrate sensitive information from a network, such as credit card numbers, trade secrets, and the like. Further types of malicious network traffic include network traffic that propagate the malware itself and network traffic that passes control commands to devices that are already infected, such as in the case of a distributed denial of service (DDoS) attack.

Inspection of network traffic is relatively straight-forward, when the network traffic is unencrypted. For example, techniques such as deep packet inspection (DPI), allows a networking device to inspect the payloads of packets and identify the contents of the packets. However, the use of traffic encryption is becoming increasingly ubiquitous. Notably, many instances of malware now use encryption, to conceal their network activity from detection. Beyond even the case of malware infection, the use of encrypted web traffic is becoming increasingly ubiquitous, making techniques such as DPI unable to identify threats and prevent sensitive data from being communicated elsewhere.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
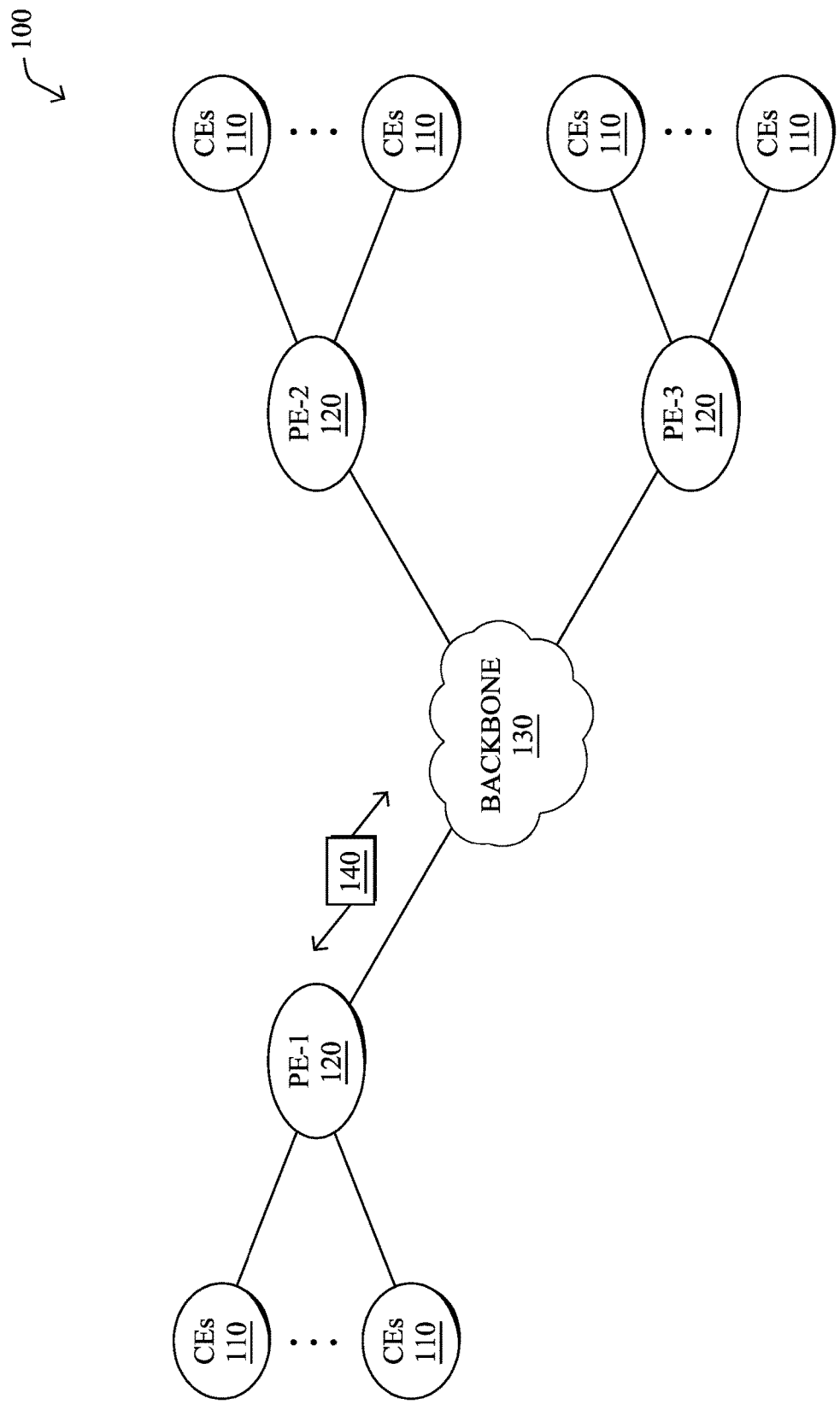
FIGS. 1A-1B illustrate an example communication network.

According to one or more embodiments of the disclosure, a network security service forms, for each of a plurality of malware classes, a feature vector descriptor for the malware class based on feature vectors extracted from traffic telemetry data for a plurality of traffic flows associated with the malware class. The service adds a set of positively labeled feature vectors to a training dataset by applying a symmetric mapping function to pairs of feature vectors that maps a pair of feature vectors to a combined feature vector, each of the pairs of feature vectors comprising one of the feature vector descriptors for one of the malware classes and a feature vector extracted from the traffic telemetry data for a traffic flow associated with that malware class. The service adds a set of negatively labeled feature vectors to the training dataset by applying the symmetric mapping function to a second set of pairs of feature vectors, each pair in the second set comprising one of the feature vector descriptors for one of the malware classes and a feature vector extracted from traffic telemetry data for normal network traffic. The service trains, using the training dataset, an instant threat detector to determine whether telemetry data for a particular traffic flow is within a threshold of similarity to a feature vector descriptor for a new malware class that was not part of the plurality of malware classes.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
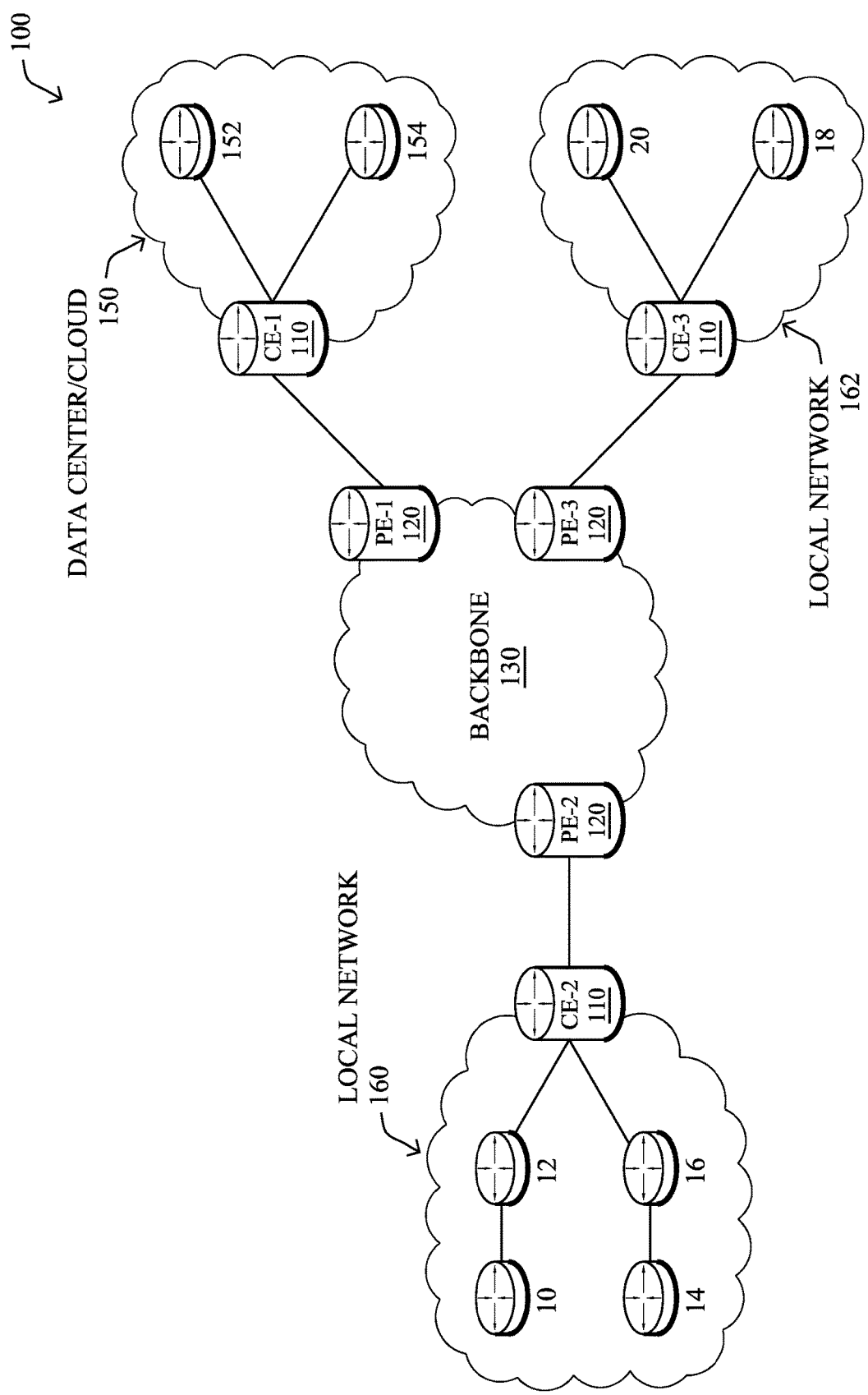

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
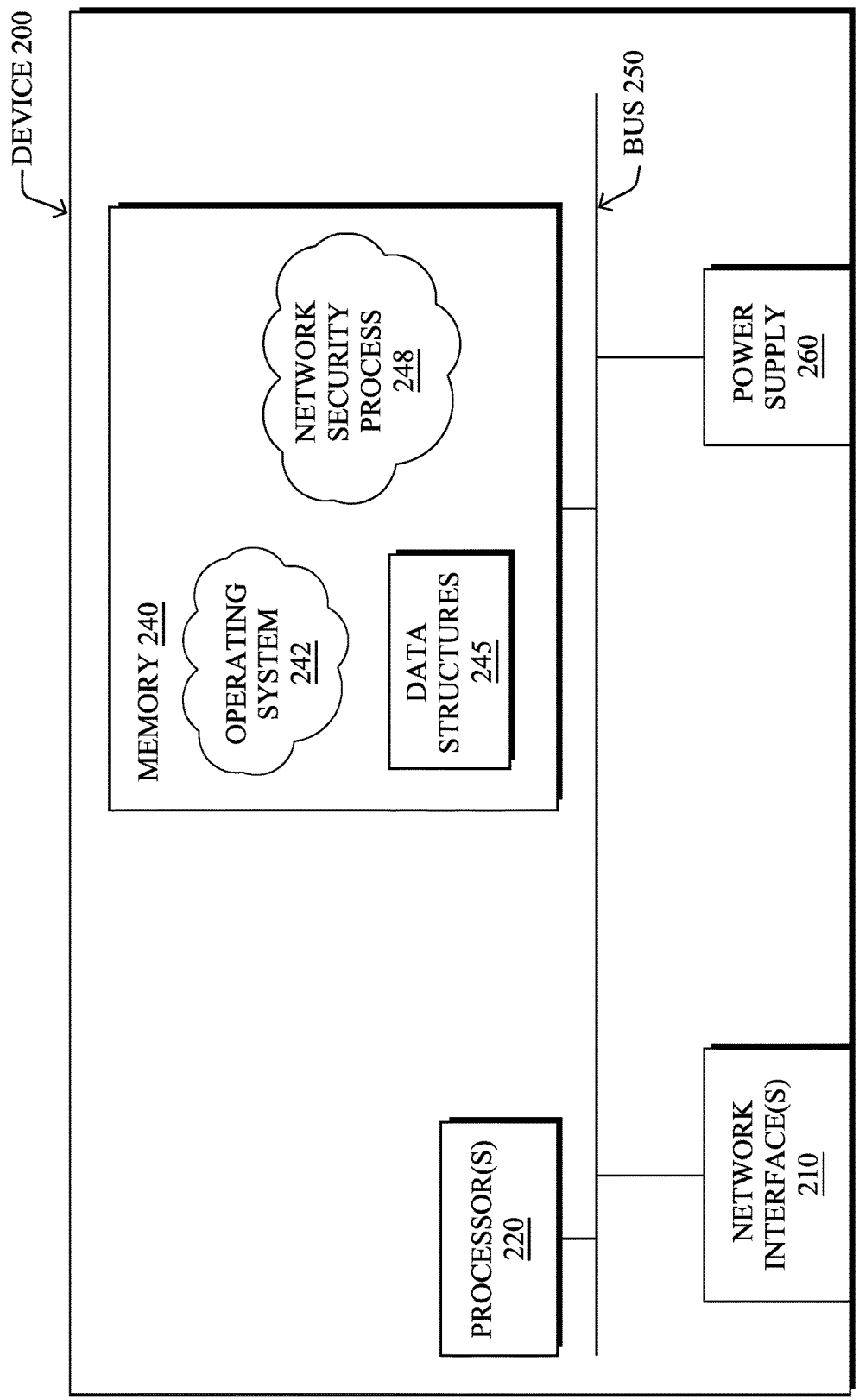
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network security process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network security process 248 may execute one or more machine learning-based classifiers to classify encrypted traffic in the network (and its originating application) for any number of purposes. In one embodiment, network security process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, network security process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Network security process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, network security process 248 can use the model M to classify new data points, such as information regarding new traffic flows in the network. Often, M is a statistical model, and the cost function is inversely proportional to the likelihood of M, given the input data.

In various embodiments, network security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that network security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network security process 248 may assess the captured telemetry data on a per-flow basis. In other embodiments, network security process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
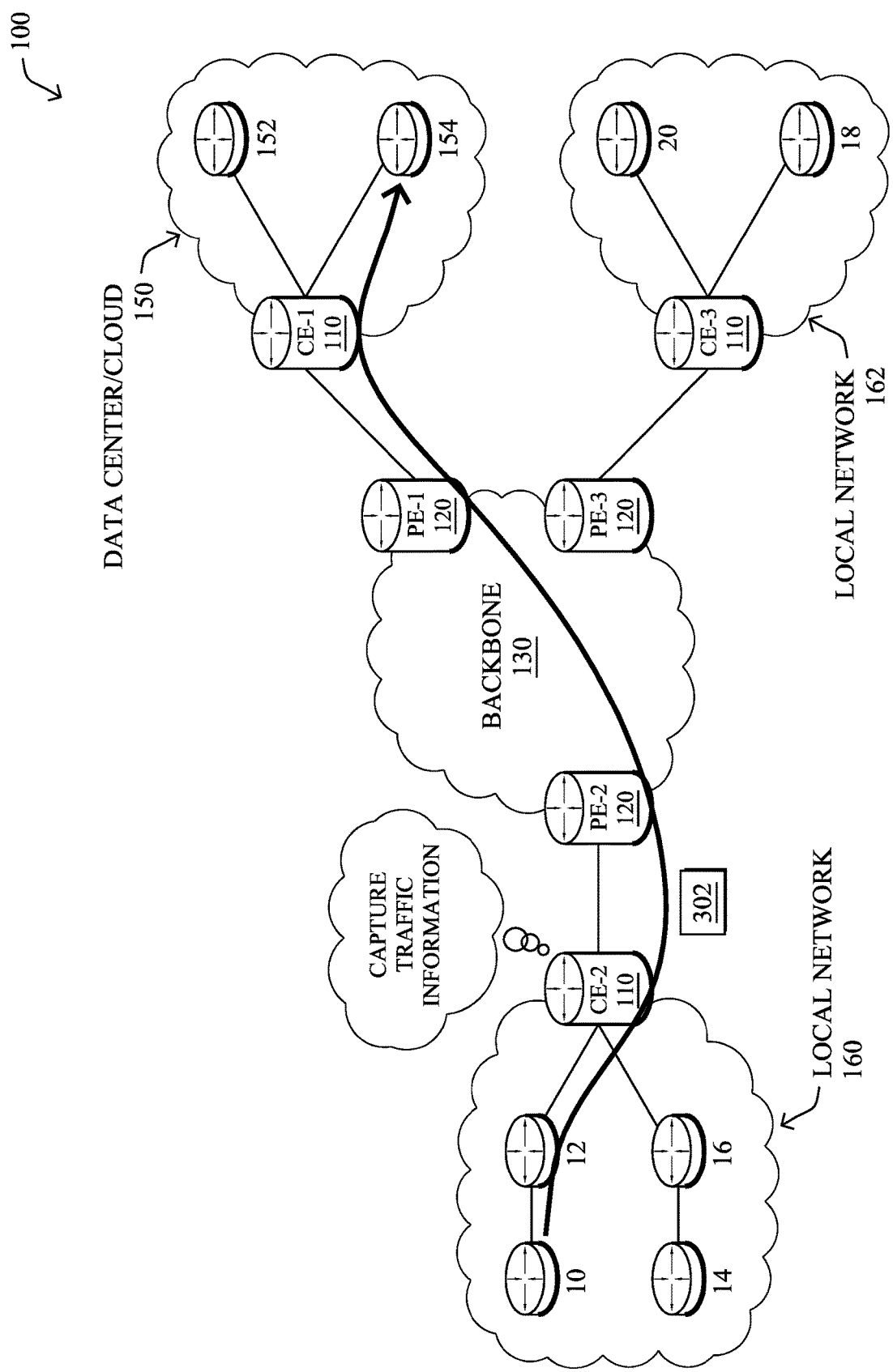
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, machine learning represents a promising technology for purposes of identifying malware-related traffic in a network. However, new malware is introduced constantly, creating pressure on the response time of the system to detect newly-emerging cyber-attacks. Once a new sample of malicious behavior is discovered, the intrusion detection system (IDS) needs to be updated with that sample, as soon as possible. However, (re-)training of a machine learning-based traffic analysis model is typically a relatively slow process, leading to a window of time between identification of the new class of malware and when the machine learning model has been updated to identify traffic flows associated with the new class of malware.

Instant Network Threat Detection System

The techniques herein introduce an approach to making learning systems more responsive in the detection of newly emerging cyber-threats. In some aspects, as soon as a new sample of malicious behavior is discovered, the running systems are temporarily supported, until they are successfully re-trained, with a pre-trained mechanism that is able to instantly detect close variants of the given malicious sample in the incoming telemetry.

Specifically, according to one or more embodiments of the disclosure as described in detail below, a network security service forms, for each of a plurality of malware classes, a feature vector descriptor for the malware class based on feature vectors extracted from traffic telemetry data for a plurality of traffic flows associated with the malware class. The service adds a set of positively labeled feature vectors to a training dataset by applying a symmetric mapping function to pairs of feature vectors that maps a pair of feature vectors to a combined feature vector, each of the pairs of feature vectors comprising one of the feature vector descriptors for one of the malware classes and a feature vector extracted from the traffic telemetry data for a traffic flow associated with that malware class. The service adds a set of negatively labeled feature vectors to the training dataset by applying the symmetric mapping function to a second set of pairs of feature vectors, each pair in the second set comprising one of the feature vector descriptors for one of the malware classes and a feature vector extracted from traffic telemetry data for normal network traffic. The service trains, using the training dataset, an instant threat detector to determine whether telemetry data for a particular traffic flow is within a threshold of similarity to a feature vector descriptor for a new malware class that was not part of the plurality of malware classes.

Illustratively, the techniques described herein may be performed by hardware, software, and/or firmware, such as in accordance with the network security process 248, which may include computer executable instructions executed by the processor 220 (or independent processor of interfaces 210) to perform functions relating to the techniques described herein.

Operationally, FIGS. 4A-4D illustrate an example architecture 400 for an instant network threat detection system. At the core of architecture 400 is network security process 248, which may comprise a training pipeline 402 and a traffic analysis pipeline 404. As shown, training pipeline 402 may comprise an instant threat detector training module 406 configured to train instant threat detector 412 in traffic analysis pipeline 404, as well as a traffic classifier training module 408 configured to train a traffic classifier 410. These components 406-412 may be implemented in a distributed manner or implemented as their own stand-alone services, either as part of the local network under observation or as a remote service (e.g., a cloud-based network security/malware-detection service). In addition, the functionalities of the components 406-412 of architecture 400 may be combined, omitted, or implemented as part of other processes, as desired.

Figure 4A:
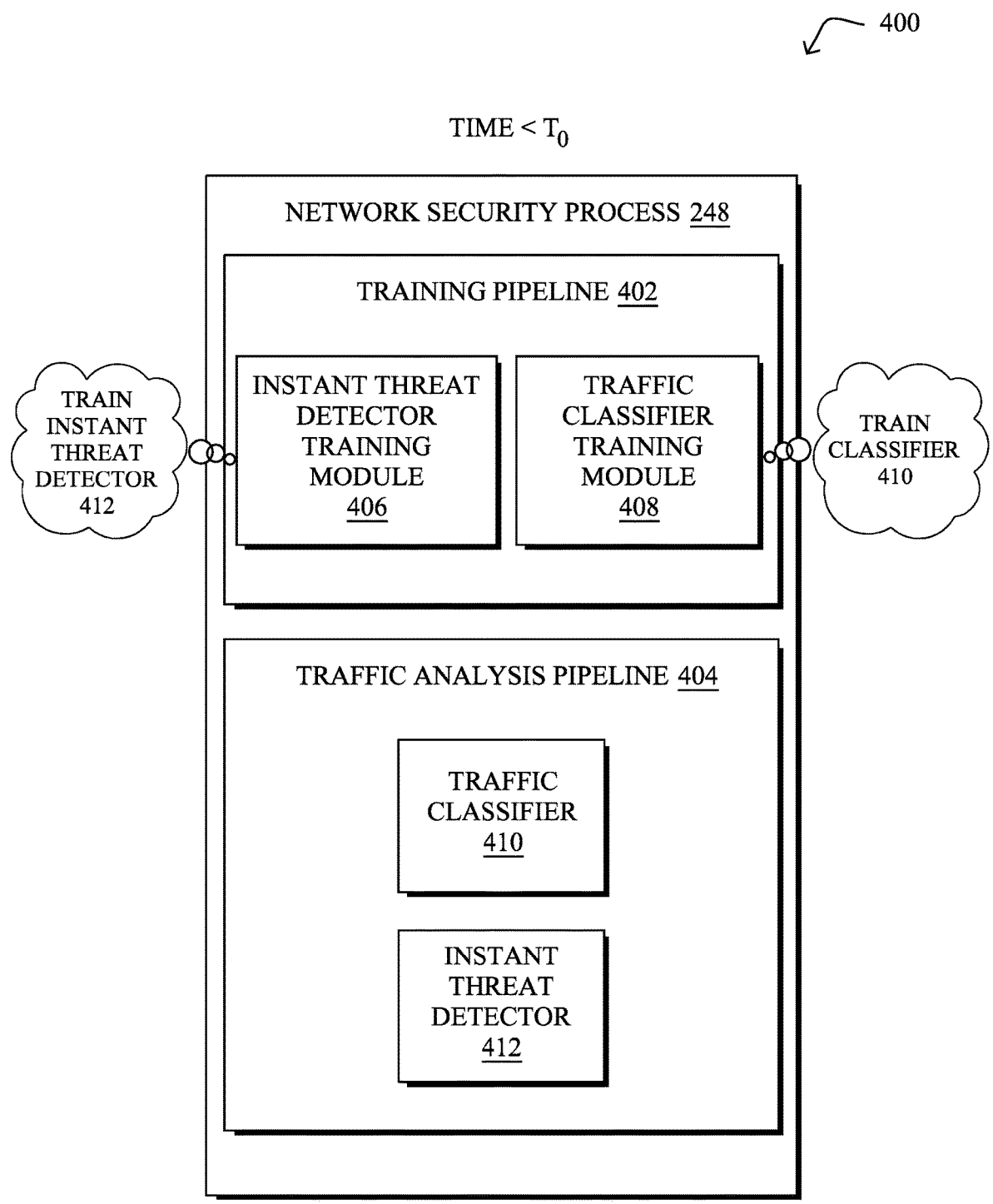
FIGS. 4A-4D illustrate an example architecture for an instant network threat detection system.

As shown in FIG. 4A, at some point in time (e.g., time<$T_0$), training pipeline 402 may operate to train traffic analysis pipeline 404. In various embodiments, at the core of traffic analysis pipeline 404 may be traffic classifier 410 that uses machine learning to classify traffic telemetry data captured for traffic flows in a network monitored by network security process 248. For example, traffic classifier 410 may, for a given traffic flow, determine whether the flow is considered benign or belongs to a particular class of malware, based on the features extracted from the telemetry data for the traffic flow. To do so, traffic classifier training module 408 may leverage a training dataset of traffic features from a large number of traffic flows that have been labeled, accordingly (e.g., traffic flow A is benign, traffic flow B belongs to malware class X, etc.).

In general, re-training of traffic classifier 410 by traffic classifier training module 408 to identify traffic for a new malware class is a relatively time-consuming process. Notably, such a process may entail adding labeled samples to the training dataset of traffic classifier training module 408 and relearning the model of traffic classifier 410. This means that there is a window of time between when the new malware class was discovered and when traffic classifier 410 is able to detect traffic associated with the new malware class.

According to various embodiments, the techniques herein propose the training, and use, of instant threat detector 412 that is able to instantly assess whether a given traffic flow is associated with a newly discovered class of malware. To train instant threat detector 412, instant threat detector training module 406 may take as input training and validation datasets ($D_{train}$, $D_{valid}$) containing samples of malicious and legitimate behavior. Such datasets may include the same samples leveraged by traffic classifier training module 408 to train traffic classifier 410, a reduced subset thereof, or a different set of traffic samples.

The output of the training process by instant threat detector training module 406 will be a similarity function s and a similarity threshold t that instant threat detector 412 uses to determine whether a particular traffic flow is within a threshold amount of similarity to a sample of a newly discovered class of malware. To better understand the training, and operation, of instant threat detector 412, any or all of the following may be established as prerequisite conditions:

Similarity function s can be decomposed as $s(x_i, x_j)=F(f(x_i, x_j))$, where F is a classification model (e.g., a random forest-based model, etc.) and f is a mapping function that converts the pair $(x_i, x_j)$ to a new feature vector serving as the input for classifier F.

Mapping function f must be symmetric, i.e., $f(x_i, x_j)=f(x_j, x_i)$ for all pairs $(x_j, x_i)$.

In a base implementation, the mapping function can be defined as $f(x_i, x_j)=[abs(x_i-x_j), (x_i+x_j)]$, where $abs(x_i-x_j)$ denotes a vector of absolute values of element-wise differences between the two vectors and $(x_i+x_j)$ element-wise summing. The square brackets [ ] above then denote concatenation of individual output vectors into a long one.

In various embodiments, the above definition can also be extended with additional terms, such as: $f(x_i, x_j)=[abs(x_i-x_j), (x_i+x_j), max(x_i, x_j), randsums(abs(x_i-x_j), 16, 113)]$, where $max(x_i, x_j)$ denotes the element-wise application of the maximum function and randsums $(abs(x_i-x_j), 16, 113)$ produces a combined vector of 113 values, each computed as a sum of 16 randomly chosen elements of vector $abs(x_i-x_j)$. Of course, the number of vector elements of the combined vector, as well as the number of elements selected for summation, can be selected as desired. The elements are chosen randomly only once at the beginning and then remain fixed for the next function calls. The benefits of these additional terms can be seen in the experimental evaluation detailed below, where three metrics/similarity functions were compared using captured network telemetry data.

Given the above prerequisites, instant threat detector training module 406 may train instant threat detector 412 as follows, in various embodiments:

1) Prepare a dataset $D_F$ of pairs: feature vector and label (x, y), for training F.
   i) For each malware class in $D_{train}$, create a single vector descriptor $x_{ms}$ (e.g. as a mean of all vectors within that class, using another statistical measure, etc.):
   ii) For each vector $x_p$ within the malware class:
      (1) Add a pair $(f(x_{ms}, x_p), 1)$ to $D_F$.
      (2) Repeat n-number of times (e.g., 1,000 times or as desired):
         (a) Randomly pick a vector $x_n$ from $D_{train}$ representing legitimate network behavior.
         (b) Add a pair $(f(x_{ms}, x_n), 0)$ to $D_F$.
2) Train F on $D_F$.
3) In order to set the threshold t properly, evaluate F on $D_{valid}$.

A number of alternate approaches also exist, in further embodiments:

When adding pairs $(f(x_{ms}, x_p), 1)$ to $D_F$, vector $x_p$ can be excluded from the mean $x_{ms}$ each time.

There is also possibility to not create a single descriptor of each malware class, but rather add all combinations of their vectors $(f(x_{p'}, x_p), 1)$ to $D_F$.

In principle, the similarity function s can be also based on Siamese neural networks.

Once trained, instant threat detector 412 may operate as follows, according to various embodiments:

Input: newly identified malicious sample $x_{ms}$ and incoming telemetry

Output: alarms/incidents

Requirements: pre-trained similarity function s and threshold t (outputs of the training stage performed by instant threat detector training module 406)

1. For each feature vector $x_{it}$ extracted from the incoming telemetry data:

Measure its similarity to the newly identified malicious sample $x_{ms}$ using the pre-trained similarity function s.

If the value exceeds a pre-defined threshold t, this indicates that the observed traffic flow is very similar to the sample of the new malware class. In other words, if $s(x_{it}, x_{ms}) > t$, instant threat detector 412 may initiate a mitigation action such as raising an alarm, triggering an incident, blocking or segregating the traffic, etc.

Figure 4B:
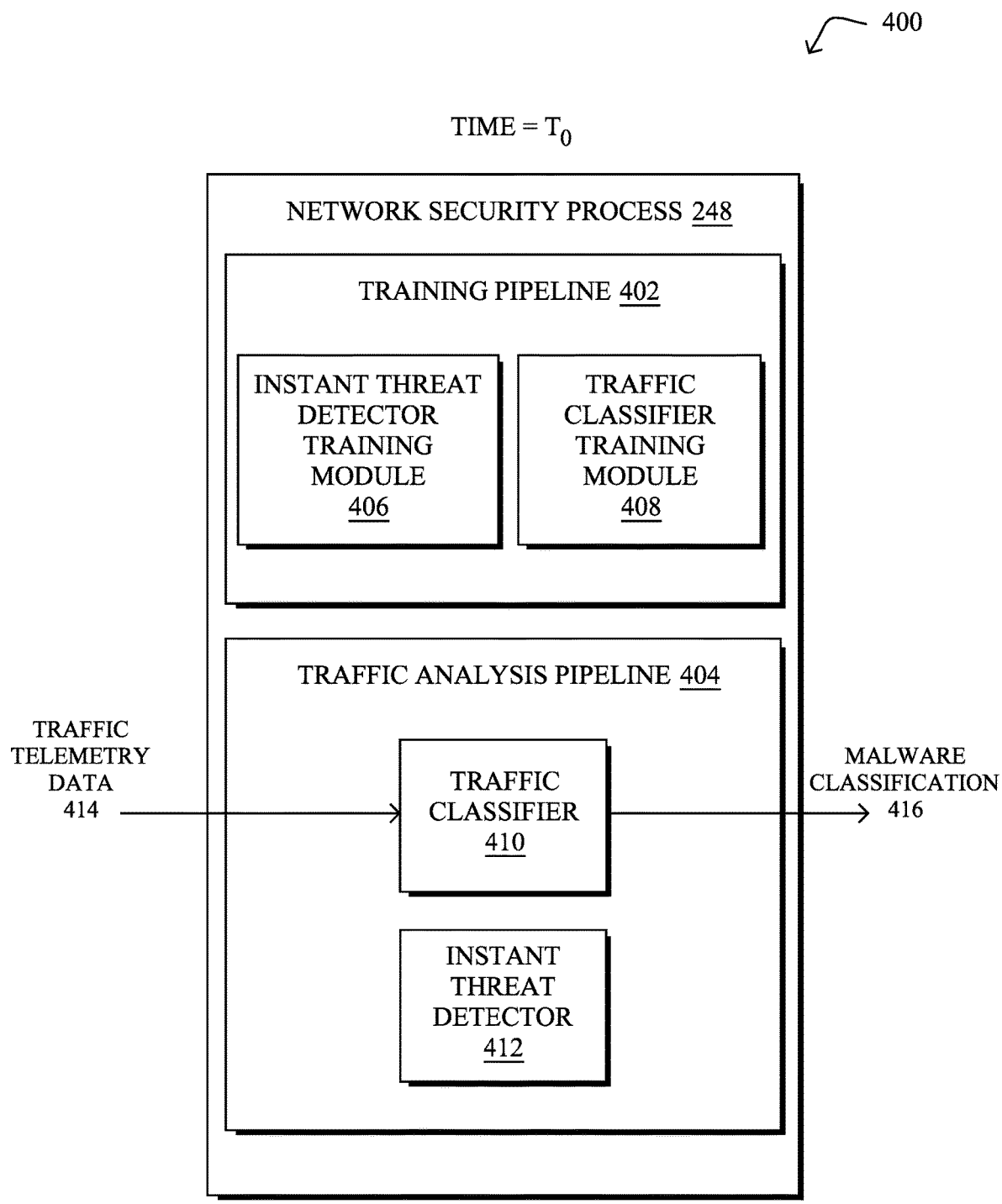
Figure 4C:
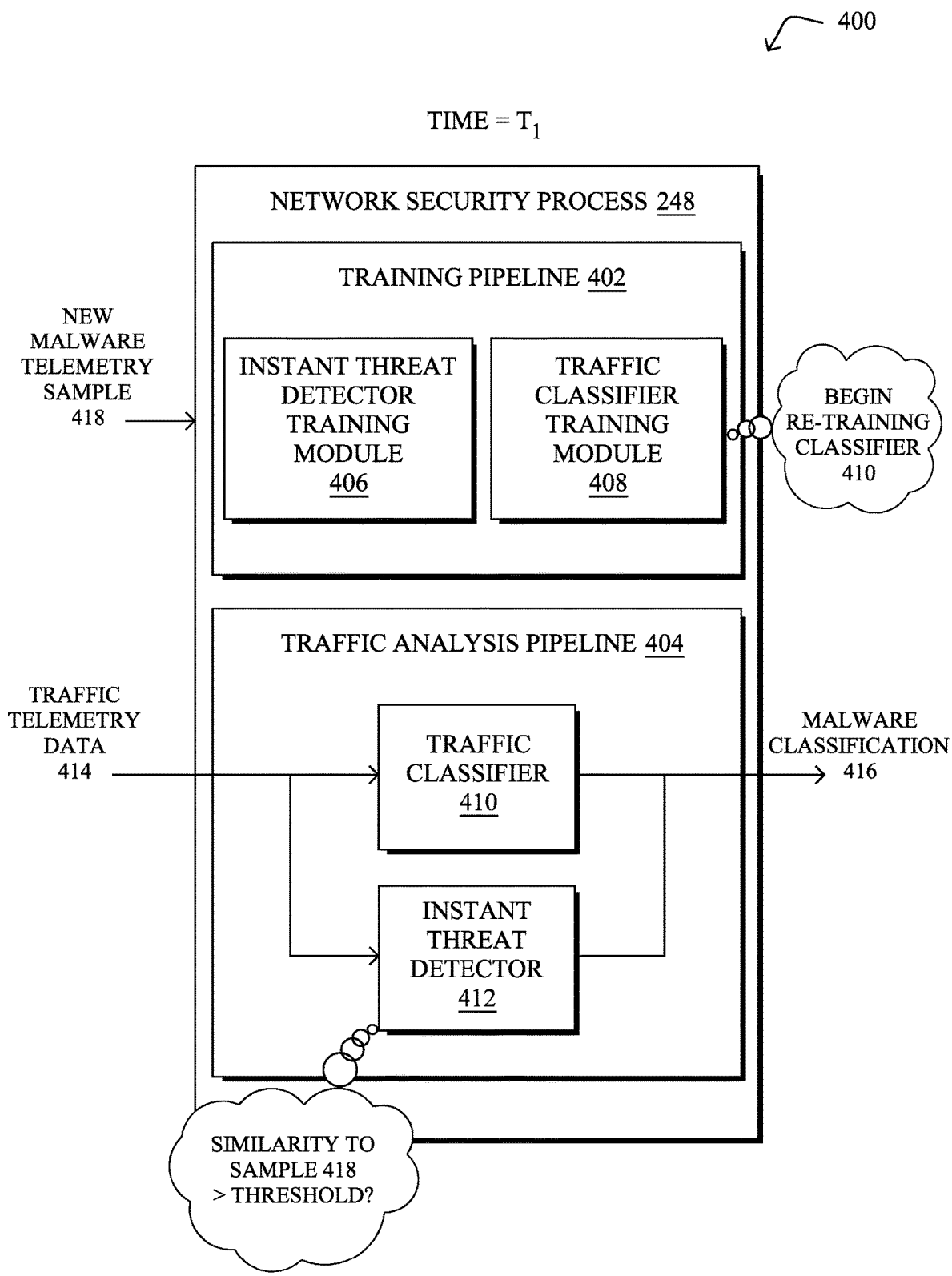
Figure 4D:
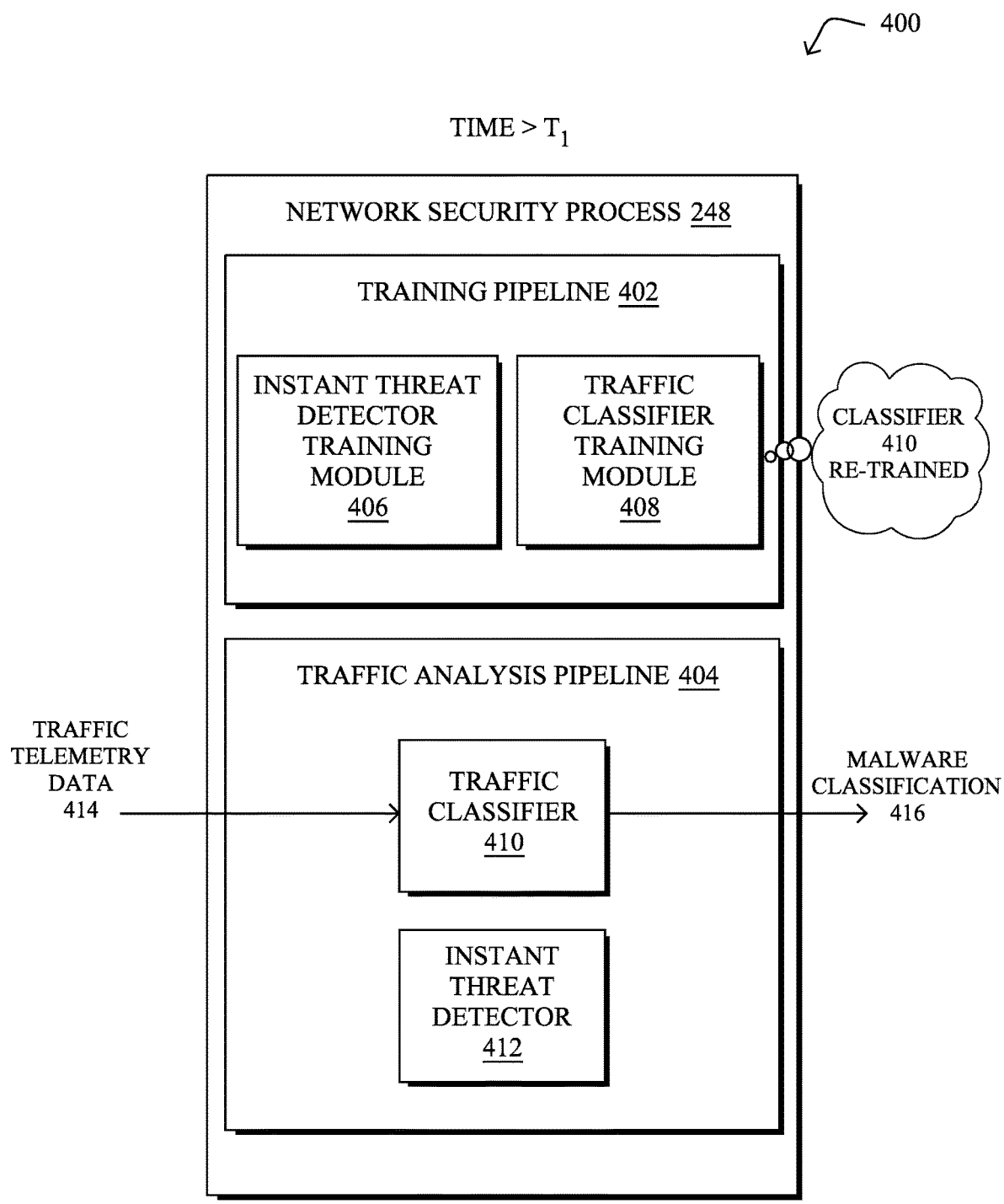

FIGS. 4B-4D illustrate the operation of architecture 400 after the training of traffic analysis pipeline 404. Once training of traffic classifier 410 and instant threat detector 412 has completed (e.g., at time=$T_0$), traffic analysis pipeline 404 may begin analyzing captured traffic telemetry data 414, as shown in FIG. 4B. Notably, features extracted from traffic telemetry data 414 may be used as input to the trained traffic classifier 410. In turn, traffic classifier 410 may output a malware classification 416 that indicates whether the corresponding traffic flow is benign or belongs to any of the malware classes on which traffic classifier 410 was trained. If traffic classifier 410 detects the presence of malware, malware classification 416 can be used to initiate any number of mitigation actions, such as sending an alert, blocking the traffic, etc.

In FIG. 4C, assume now that a new malware class has been discovered by a network security expert, a threat feed, or from any other source. In such cases, the source may send a sample 418 of the traffic telemetry data associated with the new malware class to network security process 248 at time=$T_1$). In various embodiments, this may trigger traffic classifier training module 408 to begin re-training traffic classifier 410 to also identify traffic associated with the newly discovered malware class.

As noted above, the re-training of traffic classifier 410 to identify traffic associated with the newly discovered malware class may take a certain amount of time to complete (e.g., on the order of hours or longer, etc.). Thus, in various embodiments, traffic analysis pipeline 404 may enable instant threat detector 412 to begin analyzing any incoming traffic telemetry data 414, until traffic classifier 410 has been re-trained. More specifically, instant threat detector 412 may measure the similarity between the incoming traffic telemetry data 414 and the telemetry sample 418 for the newly discovered malware class. If the similarity exceeds the predefined threshold of instant threat detector 412, instant threat detector 412 may determine that the flow under analysis is very similar to that of the new malware class and indicate as such in malware classification 416, which can be used to initiate a mitigation action. In some cases, the most current version of traffic classifier 410 may also analyze the incoming traffic telemetry data 414, to also see whether the traffic falls within any of the previously known classes of malware.

As shown in FIG. 4D, once traffic classifier training module 408 has re-trained traffic classifier 410 to identify traffic associated with the new malware class (e.g., at some time>$T_1$), traffic analysis pipeline 404 may return to its original operation by disabling instant threat detector 412 and resuming analysis by traffic classifier 410 alone. Notably, once traffic classifier 410 has been re-trained to also detect the new malware class, assessment by instant threat detector 412 is no longer needed until another new malware class is discovered.

Thus, rather than training a conventional model capable of detecting a specific set of malware classes (that are presented to the model in the training phase), the techniques herein propose learning a universal similarity function that can calculate a similarity score between a descriptor of any given malware class and a sample of processed telemetry. Unlike the conventional model, the similarity function can be independent on the malware classes used in the training phase, since the information about the current malware class is always provided as the input to the function. This allows for the instant detection of new malware classes without having to wait for model re-training. In addition, the proposed approach does not depend on any specific type of telemetry data and can work with NetFlow or IPFIX telemetry, proxy logs, Encrypted Traffic Analytics (ETA) data, or even with binary files.

Figure 5:
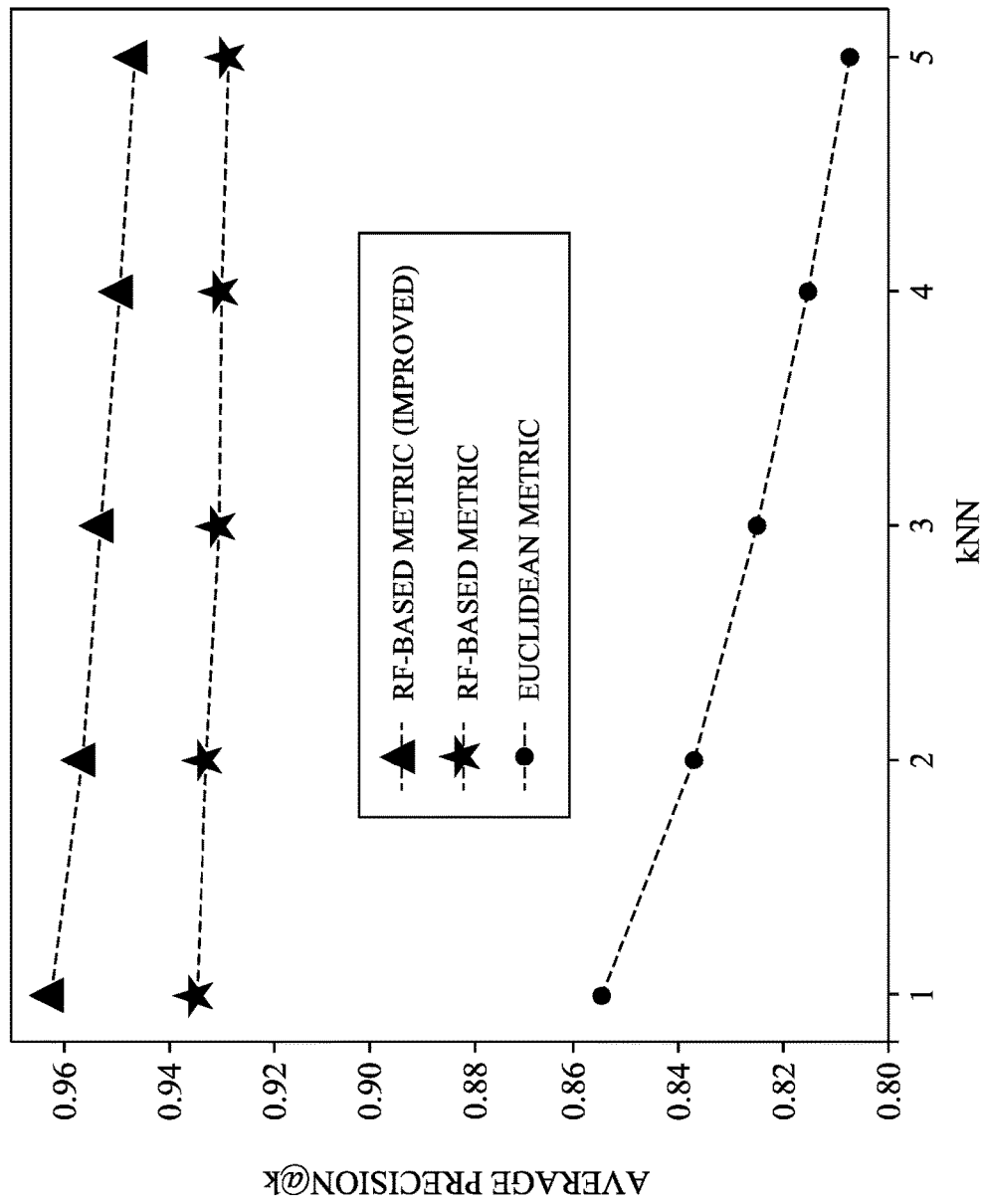
FIG. 5 illustrates an example plot of test results.

To evaluate suitability of the random forest-based metrics to network data, a small experiment was performed on HTTP access logs. Every log record was represented with 113 features that were extracted mainly from the URL field of the HTTP header. The RF-based metrics were learned on training dataset containing just 10,000 malicious/positive and 10,000 legitimate/negative log records. For each metric, including Euclidean one, the Average Precision@k was measured, where k=1 . . . 5, on an independent testing dataset containing 1,500 positive and 1,500 negative log entries. FIG. 5 illustrates a plot 500 of the test results.

As can be seen in plot 500, the best performing metric on this task was the improved RF-based metric defined as $s(x_i, x_j)$=F([abs($x_i-x_j$), ($x_i+x_j$), max($x_1, x_j$), randsums(abs($x_i-x_j$), 16, 113)]). Note that the goal of this experiment was to compare individual metrics in the way that is common for the metric learning literature and was not a full evaluation of the proposed instant threat detector itself.

Figure 6:
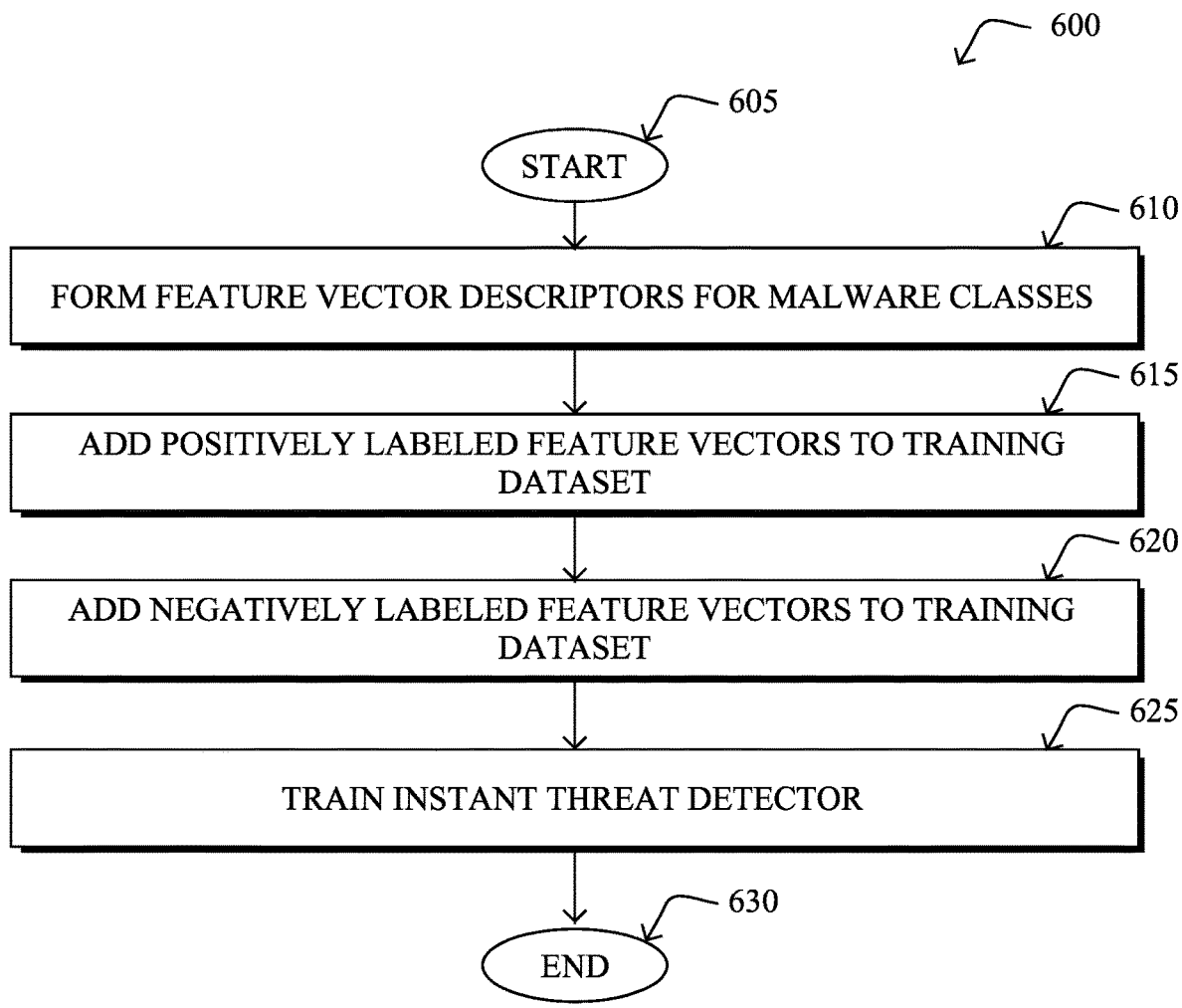
FIG. 6 illustrates an example simplified procedure for training an instant network attack detection system.

FIG. 6 illustrates an example simplified procedure for training an instant network attack detection system, in accordance with one or more embodiments described herein. For example, a non-generic, specifically configured device (e.g., device 200) may perform procedure 600 by executing stored instructions (e.g., process 248), to provide a network security service to one or more monitored networks. The procedure 600 may start at step 605, and continues to step 610, where, as described in greater detail above, the network security service may form a feature vector descriptor for the malware class based on feature vectors extracted from traffic telemetry data for a plurality of traffic flows associated with the malware class. For example, the service may take the average of the feature vectors associated with the malware class as the descriptor for that class.

At step 615, as detailed above, the network security service may add a set of positively labeled feature vectors to a training dataset by applying a symmetric mapping function to pairs of feature vectors. In various embodiments, the mapping function is configured to map a pair of feature vectors to a combined feature vector. To add the positively labeled feature vectors to the training dataset, each of the pairs of feature vectors input to the mapping function may include one of the feature vector descriptors from step 610 for one of the malware classes and a feature vector extracted from the traffic telemetry data for a traffic flow associated with that malware class. For example, such a mapping function may be defined as $f(x_i, x_j)$=[abs($x_i-x_j$), ($x_i+x_j$), max($x_i, x_j$), randsums(abs($x_i-x_j$), 16, 113)], where max($x_i, x_j$) denotes the element-wise application of the maximum function and randsums(abs($x_i-x_j$), 16, 113), and produces a combined vector of 113 values, each computed as a sum of 16 randomly chosen elements of vector abs($x_i-x_j$).

At step 620, the network security service may add a set of negatively labeled feature vectors to the training dataset, as described in greater detail above. In some embodiments, the service may do so by applying the symmetric mapping function to a second set of pairs of feature vectors, each pair in the second set including one of the feature vector descriptors for one of the malware classes and a feature vector extracted from traffic telemetry data for normal network traffic. Similar to step 615, the mapping function may form a combined feature vector based on the two input feature vectors and the service may negatively label the resulting vector, accordingly (i.e., that the vectors are not similar.

At step 625, as detailed above, the network security service may use the training dataset to train an instant threat detector to determine whether telemetry data for a particular traffic flow is within a threshold of similarity to a feature vector descriptor for a new malware class that was not part of the plurality of malware classes. Notably, the trained detector may take as input a sample descriptor for the new malware class and determine whether a traffic flow under scrutiny is sufficiently similar to that new malware class to initiate a mitigation action. As would be appreciated, this approach does not require any pre-training on the new malware class and can be used as soon as the descriptor for the new malware class is available. In some embodiments, the service may leverage the instant threat detector to make the similarity assessments until a traffic classifier of the service has been re-trained to also identify flows associated with that new malware class. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of traffic flows associated with new classes of malware, as soon as an example of that new malware class becomes available. This allows the system to protect against the new malware class, while still affording time to retrain its traffic classifier on the new malware class. In some aspects, the instant threat detector may evaluate the similarity between any two feature vectors (e.g., a representative of the new malware class and the traffic under scrutiny) in a way that does not require any actual training on the new malware class itself.

While there have been shown and described illustrative embodiments that provide for dynamically tracking/modeling systems according to risk level, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    forming, by a network device executing a network security service and for each of a plurality of malware classes, a feature vector descriptor for the malware class based on feature vectors extracted from traffic telemetry data for a plurality of traffic flows associated with the malware class;
    adding, by the network device, a set of positively labeled feature vectors to a training dataset by applying a symmetric mapping function to pairs of feature vectors that maps a pair of feature vectors to a combined feature vector, each of the pairs of feature vectors comprising one of the feature vector descriptors for one of the malware classes and a feature vector extracted from the traffic telemetry data for a traffic flow associated with that malware class;
    adding, by the network device, a set of negatively labeled feature vectors to the training dataset by applying the symmetric mapping function to a second set of pairs of feature vectors, each pair in the second set comprising one of the feature vector descriptors for one of the malware classes and a feature vector extracted from traffic telemetry data for normal network traffic;
    training, by the network device and using the training dataset, an instant threat detector to determine whether telemetry data for a particular traffic flow is within a threshold of similarity to a feature vector descriptor for a new malware class that was not part of the plurality of malware classes; and
    learning, by the network device, the threshold of similarity by evaluating a classification model of the instant threat detector using a validation dataset separate from the training dataset.

2. The method as in claim 1, further comprising:
    receiving, at the network device, a feature vector descriptor for a new malware class; and
    using, by the network device, the instant threat detector to evaluate whether traffic flows observed in a network belong to the new malware class.

3. The method as in claim 2, further comprising:
    re-training, by the network device, a machine learning-based traffic classifier to identify traffic associated with the new malware class, while using the instant threat detector to evaluate whether traffic flows observed in a network belong to the new malware class.

4. The method as in claim 1, wherein the instant threat detector uses the symmetric mapping function to map a feature vector extracted from the telemetry data for the particular traffic flow and the feature vector descriptor for the new malware class into a combined feature vector for input to the classification model.

5. The method as in claim 4, wherein the threshold of similarity is learned by evaluating the classification model using the validation dataset after the training of the instant threat detector using the training dataset.

6. The method as in claim 4, wherein the classification model comprises a random forest classifier.

7. The method as in claim 1, wherein the symmetric mapping function maps a pair of feature vectors to a combined feature vector by performing element-wise operations on elements of the feature vectors in the pair, and wherein the symmetric mapping function generates the combined feature vector in part by randomly selecting elements from a result of the performed element-wise operations.

8. The method as in claim 1, wherein the feature vector extracted from the traffic telemetry data for a traffic flow associated with the malware class is excluded from formation of the feature vector descriptor for that malware class.

9. The method as in claim 1, wherein forming, for each of the plurality of malware classes, a feature vector descriptor for the malware class based on feature vectors extracted from traffic telemetry data for a plurality of traffic flows associated with the malware class comprises:
    forming the feature vector descriptor for a malware class as a mean of the feature vectors associated with the malware class.

10. An apparatus, comprising:
    one or more network interfaces to communicate with a network;
    a processor coupled to the network interfaces and configured to execute one or more processes; and a memory configured to store a process executable by the processor, the process when executed configured to:
   form, for each of a plurality of malware classes, a feature vector descriptor for the malware class based on feature vectors extracted from traffic telemetry data for a plurality of traffic flows associated with the malware class;
   add a set of positively labeled feature vectors to a training dataset by applying a symmetric mapping function to pairs of feature vectors that maps a pair of feature vectors to a combined feature vector, each of the pairs of feature vectors comprising one of the feature vector descriptors for one of the malware classes and a feature vector extracted from the traffic telemetry data for a traffic flow associated with that malware class;
   add a set of negatively labeled feature vectors to the training dataset by applying the symmetric mapping function to a second set of pairs of feature vectors, each pair in the second set comprising one of the feature vector descriptors for one of the malware classes and a feature vector extracted from traffic telemetry data for normal network traffic;
   train, using the training dataset, an instant threat detector to determine whether telemetry data for a particular traffic flow is within a threshold of similarity to a feature vector descriptor for a new malware class that was not part of the plurality of malware classes; and
   learn the threshold of similarity by evaluating a classification model of the instant threat detector using a validation dataset separate from the training dataset.

11. The apparatus as in claim 10, wherein the process when executed is further configured to:
   receive a feature vector descriptor for a new malware class; and
   use the instant threat detector to evaluate whether traffic flows observed in a network belong to the new malware class.

12. The apparatus as in claim 11, wherein the process when executed is further configured to:
   re-train a machine learning-based traffic classifier to identify traffic associated with the new malware class, while using the instant threat detector to evaluate whether traffic flows observed in a network belong to the new malware class.

13. The apparatus as in claim 10, wherein the instant threat detector uses the symmetric mapping function to map a feature vector extracted from the telemetry data for the particular traffic flow and the feature vector descriptor for the new malware class into a combined feature vector for input to the classification model.

14. The apparatus as in claim 13, wherein the threshold of similarity is learned by evaluating the classification model using the validation dataset after the training of the instant threat detector using the training dataset.

15. The apparatus as in claim 13, wherein the classification model comprises a random forest classifier.

16. The apparatus as in claim 10, wherein the symmetric mapping function maps a pair of feature vectors to a combined feature vector by performing element-wise operations on elements of the feature vectors in the pair, and wherein the symmetric mapping function generates the combined feature vector in part by randomly selecting elements from a result of the performed element-wise operations.

17. The apparatus as in claim 10, wherein the feature vector extracted from the traffic telemetry data for a traffic flow associated with the malware class is excluded from formation of the feature vector descriptor for that malware class.

18. The apparatus as in claim 10, wherein the apparatus forms, for each of the plurality of malware classes, a feature vector descriptor for the malware class based on feature vectors extracted from traffic telemetry data for a plurality of traffic flows associated with the malware class by:
   forming the feature vector descriptor for a malware class as a mean of the feature vectors associated with the malware class.

19. A tangible, non-transitory, computer-readable medium storing program instructions that cause a network device to execute a process comprising:
   forming, by the network device and for each of a plurality of malware classes, a feature vector descriptor for the malware class based on feature vectors extracted from traffic telemetry data for a plurality of traffic flows associated with the malware class;
   adding, by the network device, a set of positively labeled feature vectors to a training dataset by applying a symmetric mapping function to pairs of feature vectors that maps a pair of feature vectors to a combined feature vector, each of the pairs of feature vectors comprising one of the feature vector descriptors for one of the malware classes and a feature vector extracted from the traffic telemetry data for a traffic flow associated with that malware class;
   adding, by the network device, a set of negatively labeled feature vectors to the training dataset by applying the symmetric mapping function to a second set of pairs of feature vectors, each pair in the second set comprising one of the feature vector descriptors for one of the malware classes and a feature vector extracted from traffic telemetry data for normal network traffic;
   training, by the network device and using the training dataset, an instant threat detector to determine whether telemetry data for a particular traffic flow is within a threshold of similarity to a feature vector descriptor for a new malware class that was not part of the plurality of malware classes; and
   learning, by the network device, the threshold of similarity by evaluating a classification model of the instant threat detector using a validation dataset separate from the training dataset.

20. The computer-readable medium as in claim 19, wherein the process further comprises:
   receiving, at the network device, a feature vector descriptor for a new malware class; and
   using, by the network device, the instant threat detector to evaluate whether traffic flows observed in a network belong to the new malware class.

* * * * *